(12) United States Patent
Hanne et al.

(10) Patent No.: US 6,318,779 B1
(45) Date of Patent: Nov. 20, 2001

(54) PARALLELLY-GRIPPING CHUCK

(75) Inventors: Hiroshi Hanne; Koichiro Ishibashi, both of Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/556,331

(22) Filed: Apr. 24, 2000

(30) Foreign Application Priority Data

Jun. 3, 1999 (JP) .................................................. 11-156849

(51) Int. Cl.[7] .................................................. B25J 15/08
(52) U.S. Cl. ............................ 294/88; 294/119.1; 901/37
(58) Field of Search ........................... 294/88, 93, 103.1, 294/115, 116, 119.1; 269/25, 27, 32, 34; 901/36, 37, 39; 279/110, 117–119, 124

(56) References Cited

U.S. PATENT DOCUMENTS

| | | | |
|---|---|---|---|
| 4,607,873 | * 8/1986 | Nusbaumer et al. | ......... 294/119.1 X |
| 4,741,568 | * 5/1988 | Borcea et al. | ................. 294/119.1 X |
| 4,874,194 | * 10/1989 | Borcea et al. | ................. 294/119.1 X |
| 4,913,481 | * 4/1990 | Chin et al. | ..................... 294/119.1 X |
| 5,529,359 | * 6/1996 | Borcea et al. | ................. 294/119.1 X |
| 5,595,413 | * 1/1997 | McGeachy et al. | .......... 294/119.1 X |

FOREIGN PATENT DOCUMENTS

| | | |
|---|---|---|
| 0 170 103 | 2/1986 | (EP) . |
| 0 208 827 | 1/1987 | (EP) . |
| 0 293 153 | 11/1988 | (EP) . |
| 2 322 116 | 8/1998 | (GB) . |

* cited by examiner

Primary Examiner—Johnny D. Cherry
(74) Attorney, Agent, or Firm—Oblon, spivak, McClelland, Maier & Neustadt, P.C.

(57) ABSTRACT

An opening/closing operation of a pair of jaw components is linearly guided by a single guide block attached to the chuck body. The guide block comprises the block body, a pair of guide walls formed integrally on a first face of the block body, and one or two attaching walls formed integrally on a second face of the block body.

7 Claims, 7 Drawing Sheets

PARALLELLY-GRIPPING CHUCK

FIELD OF THE INVENTION

The present invention relates to a parallelly-gripping chuck for gripping a workpiece by a pair of jaw components which are opened and closed by the action of a fluid pressure.

PRIOR ART

Conventionally, a chuck used for gripping, carriage, and the like of various workpieces, in which a jaw member for gripping a workpiece is assembled to the chuck body so that the components of the jaw member are linearly opened and closed and the jaw member performs a gripping operation by a piston driven by an air pressure, disposed in a cylindrical hole in the body, is known.

The chuck of this kind is mounted and used in various industrial robots and the like. Recently, an occasion of gripping and carrying a precise and small part as a workpiece in a limited narrow space is increasing. In order to stably and safely grip and carry the workpiece, a small chuck which is suited to the size of the workpiece and work space becomes indispensable.

In the chuck, usually, a guide block for guiding the pair of components of the jaw so that the jaw components are opened and closed in parallel with each other is attached to an end of the chuck body by an attaching screw. It is, however, difficult to assure the space for the attaching screw. A technique (Japanese Unexamined Utility Model Publication No. 3-44587) intended to solve the problem as shown in FIG. 10 is known. In the technique, two thin-plate guide members 44 and 44 for guiding a jaw member 43 are in contact with recessed steps 42 and 42 formed on both side faces at an end of the chuck body 41. The guide members 44 and 44 are attached to the body 41 by tightening screws 45 and 45 which penetrate in the thickness direction of the guide members 44 and 44.

In the chuck of this type, the thickness of each of the guide members 44 and the body 41 can be reduced irrespective of the size of the tightening screws and their screw holes, so that the whole chuck can be made thinner. The chuck is therefore much smaller than conventional ones.

In the chuck, however, since the jaw member 43 is guided between the two guide members 44 and 44, in order to stably and securely grip the workpiece, the guide members 44 and 44 have to be stably fixed by the tightening screws in consideration of the relative positional relation. It is necessary to check whether the guide members 44 and 44 are properly securely tightened at the time of assembly and maintenance of the chuck.

DISCLOSURE OF THE INVENTION

A technical subject of the invention is to provide a smaller chuck in which guide members for guiding a jaw member are easily assembled and maintained and which can stably guide a pair of jaw components.

Another technical subject of the invention is to provide a chuck capable of always stably and securely gripping a workpiece.

In order to achieve the above subject, according to a chuck of the invention, a pair of jaw components for gripping a workpiece are assembled to the chuck body so as to be linearly opened and closed via a single guide block.

The guide block integrally has: a block body of a substantially rectangular shape, having a first face on one side and a second face on the opposite side; a pair of guide walls which are formed integrally and symmetrically on a first face side of the block body, and extend in parallel with each other in the length direction of the block body, and between which the pair of jaw components are slidably fit; and at least one attaching wall which is integrally formed on a second face side of the block body and extends in the length direction of the block body. The attaching wall is attached to the chuck body by being in contact with the outer face of an end of the chuck body and being fixed by attaching screws.

In the chuck having the above construction, since the guide block for linearly guiding the pair of jaw components integrally has the block body, the guide walls, and the attaching wall and their relative positions are unchanged and have always a proper positional relation. Consequently, only by checking the state where the attaching wall is securely connected to the chuck body by the attaching screws, the gripping operation of the jaw components can be performed always stably and securely. A troublesome check of an assembly state of the guide member as conventionally performed can be omitted.

Since the attaching wall can be attached to the chuck body by screwing the attaching screws in the thickness direction of the attaching wall in a state where the attaching wall is in contact with the outer face of the chuck body, the attachment by using the attaching screws is very easy, and the thickness of the chuck body can be reduced irrespective of the size of the attaching screw and the like. The whole chuck can be therefore slimmed and miniaturized.

According to an embodiment of the invention, a step at least having a depth which is equal to a thickness of the attaching wall is formed on the outer face of the chuck body, and the attaching wall is fixed to the chuck body in a state where the attaching wall is fit in the step so as not to be projected from the outer face of the chuck body.

One attaching wall can be formed on one end in the width direction of the guide block or two attaching walls can be formed on both ends. When the number of the attaching wall is one, the step is formed on one of the outer faces of the chuck body. When the number of the attaching walls is two, two steps are formed on both outer faces of the chuck body.

When two each of the attaching walls and steps are formed, preferably, one of the two steps is formed to be slightly deeper than the other step, thereby forming an interval between two attaching walls slightly larger than a distance between the two steps. A gap between the step and the attaching wall is absorbed by a deflection of the step when each of the attaching walls is screwed to each of the steps.

According to another embodiment of the invention, the transforming means is a pair of levers. An intermediate portion of each of the levers is pivotally supported by the chuck body, one end of the lever is connected to the piston rod, the other end extends to a position between the pair of guide walls through a leading hole formed on the block body of the guide block, and the levers are connected to corresponding jaw components.

DETAILED DESCRIPTION

Figure 1:
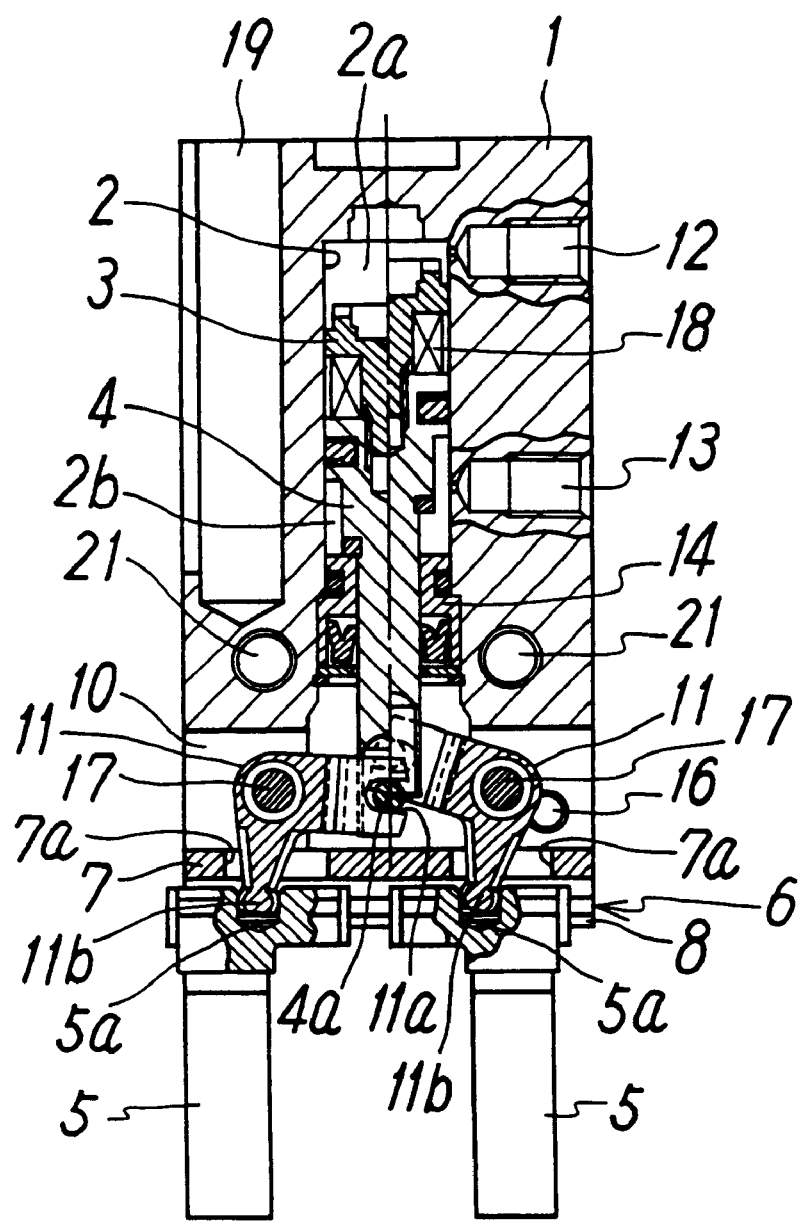
FIG. 1 is a longitudinal sectional front view showing a first embodiment of a chuck of the invention. The right side shows a state where a piston is moved upward and jaw components are closed and the left side shows a state where the piston is moved downward and the jaw components are opened.
Figure 2:
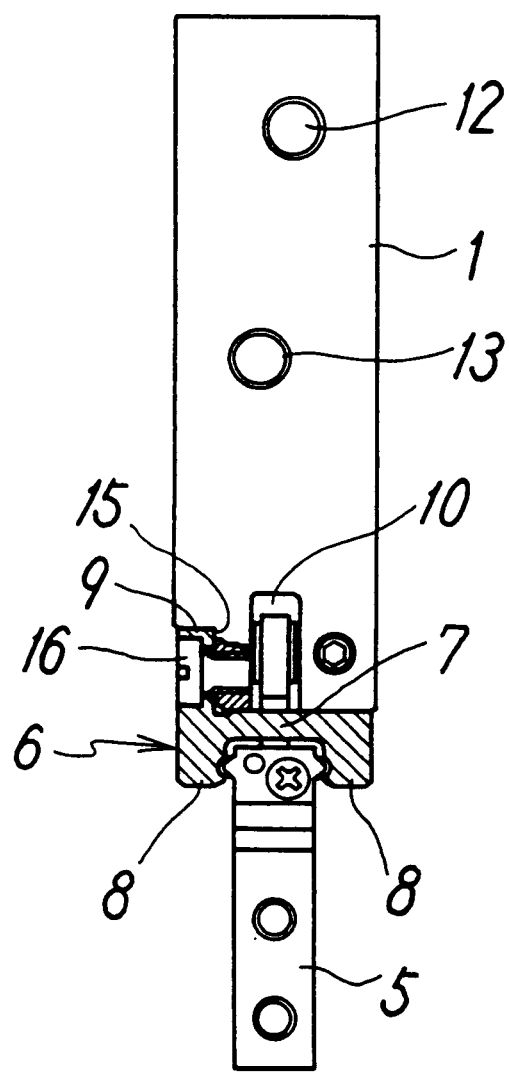
FIG. 2 is a partly sectional right side view of the embodiment of FIG. 1.
Figure 3:
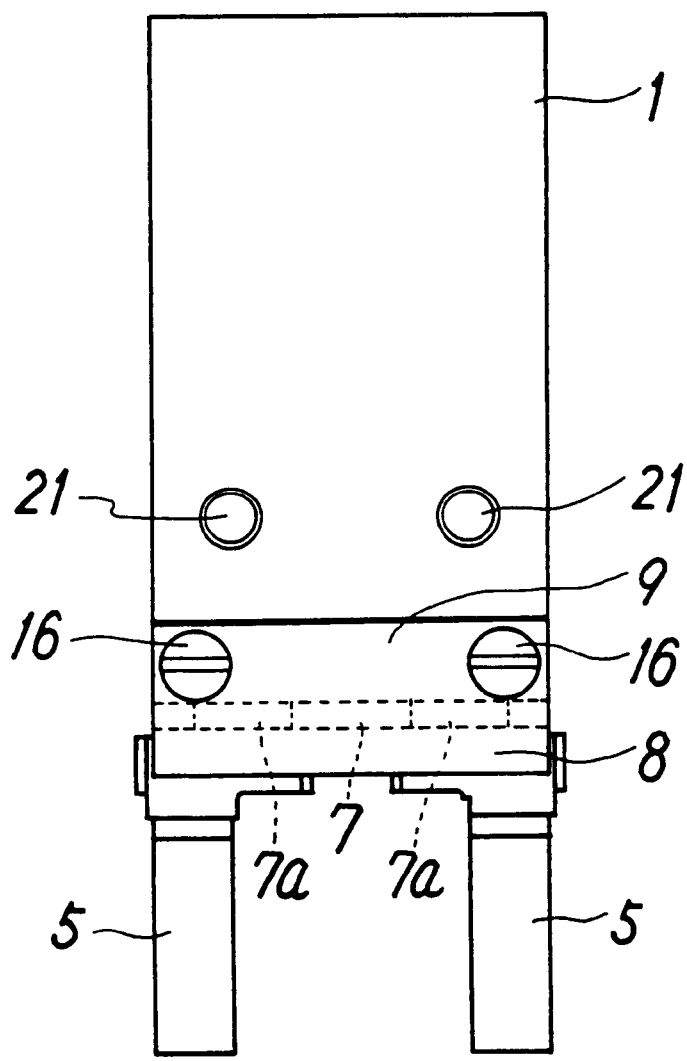
FIG. 3 is a rear elevation of the embodiment of FIG. 1.

FIGS. 1 to 3 show a first embodiment of a parallelly-gripping chuck of the invention. The chuck of the embodiment comprises: a chuck body 1 which has a substantially rectangular parallelpiped shape and has therein a cylindrical hole 2; a piston 3 which is slidably inserted in the cylindrical hole 2 and is driven by air pressure in the axial direction; a piston rod 4 which is attached to the piston 3 and whose tip is projected from one end of the cylindrical hole 2; a pair of jaw components 5 and 5 which are assembled to an end from which the piston rod 4 of the chuck body 1 is projected so as to be opened and closed via a guide block 6; a transforming means for transforming the movement of the piston rod 4 to an operation of opening or closing the pair of jaw components 5 and 5; and the guide block 6 for linearly guiding the opening/closing operation of the pair of jaw components 5 and 5 in the direction which perpendicularly crosses the axial line of the rod 4.

The chuck body 1 has ports 12 and 13 communicated with a head side pressure chamber 2a and a rod side pressure chamber 2b of the piston 3, respectively, and the ports 12 and 13 are opened on a side face of the chuck body 1. When compressed air is supplied/exhausted to/from the head side pressure chamber 2a and the rod side pressure chamber 2b through the ports 12 and 13, respectively, the piston 3 and the rod 4 slide to and from in the cylindrical hole 2.

The cylindrical hole 2 is opened from the lower end side of the chuck body 1 to the upper part but does not penetrate the upper end of the chuck body 1. On the opening side of the cylindrical hole 2, an end plate 14 which air-tightly closes the opening and air-tightly leads the rod 4 to the outside of the cylindrical hole 2 is fixed.

Figure 4:
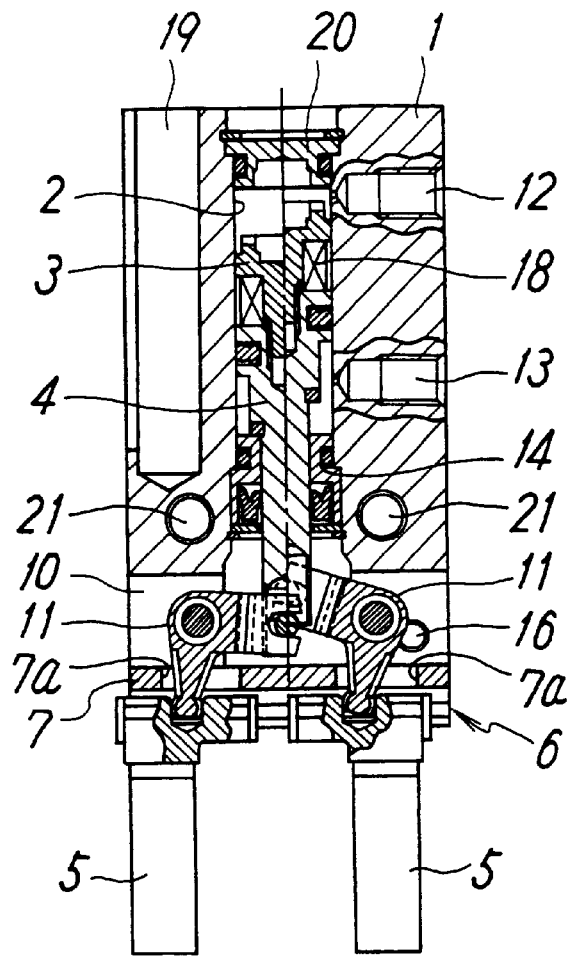
FIG. 4 is a longitudinal sectional front view showing a second embodiment of the invention. The right side shows a state where a piston is moved upward and the left side shows a state where the piston is moved downward.
Figure 5:
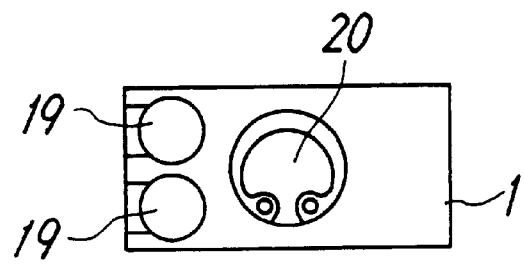
FIG. 5 is a plan view of the above embodiment.

As in a second embodiment shown in FIGS. 4 and 5, the cylindrical hole 2 vertically penetrates the chuck body 1 and the upper end of the cylindrical hole 2 can be air-tightly closed with a cap 20.

A permanent magnet 18 for position detection is attached to the piston 3. The operating position of the piston 3 can be detected by a magnetic sensor (not shown) housed in a pair of grooves 19 (same as in FIG. 5) on the outer face of the chuck body 1.

A recess 10 is formed at the lower end of the chuck body 1. In the recess 10, the tip of the rod 4 is led and a pair of levers 11 and 11 each having an almost L shape, as transforming means for transforming the movement of the rod 4 to the opening/closing operation of the jaw components 5 and 5, are disposed.

An intermediate portion of each of the levers 11 is rotatably supported to the chuck body 1 by a pin 17. A drive pin 4a at the tip of the rod 4 is fit in and retained by a recessed notch 11a formed at the proximal end of the lever 11 and a spherical tip 11b of the lever 11 pivotally is fit in an engagement hole 5a of the jaw member 5. When the rod 4 moves upward or downward, the levers 11 and 11 swing around the pins 17 as a center, thereby opening or closing the jaw components 5 and 5.

In the case of this embodiment, the levers 11 and 11 allow the jaw components 5 and 5 to be closed when the piston 3 is moved upward as shown in the right half of FIG. 1, and, on the other hand, the jaw components 5 and 5 to be opened when the piston 3 is moved downward as shown in the left half of FIG. 1.

In a position which covers the recess 10 in the chuck body 1, the guide block 6 is attached so as to close the recess 10.

The guide block 6 integrally comprises: a block body 7 having a lower first face and an upper second face and a substantially rectangular shape; a pair of guide walls 8 and 8 for guiding the pair of jaw components 5 and 5 in the gripping direction in a state where the pair of jaw components 5 and 5 are sandwiched from both sides; and an attaching wall 9 for attaching the guide block 6 to the chuck body 1.

In this embodiment, the length in the longitudinal direction of the guide block 6 is substantially the same as the width of the chuck body 1. The length in the transverse direction of the guide block 6 is substantially the same as the thickness of the chuck body 1.

The guide walls 8 and 8 are symmetrically provided at both ends in the width direction of the first face of the block body 7 so as to extend in the longitudinal direction of the block body 7 in parallel with each other. The pair of jaw components 5 and 5 are fit between the guide walls 8 and 8. Between the inner faces of the guide walls 8 and 8 and both outer faces of each of the jaw components 5 and 5, a linear guiding mechanism for linearly moving the jaw components 5 and 5 in the direction which perpendicularly crosses the axial line of the rod 4 is provided.

The linear guiding mechanism is constructed by disposing a plurality of rolling elements housed in a retainer in a V- or U-groove formed between the inner face of each of the guide walls 8 and 8 and both outer faces of the jaw components 5 and 5. By the linear guiding mechanism, the jaw components 5 and 5 are slidably fit between the guide walls 8 and 8.

Two leading holes 7a and 7a are opened in the block body 7. The leading holes 7a and 7a are used to lead the spherical tips 11b and 11b of the pair of levers 11 and 11 to a position between the guide walls 8 and 8 and to make each of the spherical tips 11b and 11b come into engagement with the engagement holes 5a and 5a of the jaw components 5 and 5. The leading holes 7a and 7a are formed in positions corresponding to the levers 11 and 11 and are small enough not to disturb the rotation of the levers 11 and 11.

The attaching wall 9 is provided on the second face as the top face of the block body 7 so as to extend in the longitudinal direction of the block body 7 in a position at one end in the width direction of the block body 7 and is in contact with one outer side of the chuck body 1.

In this case, as shown in FIG. 2, it is effective in slimming of the whole shape that, at the outer face of the chuck body 1, a step 15 having a depth which is at least the same as the thickness of the attaching wall 9 is formed and the attaching wall 9 is mounted in a state where the attaching wall 9 is fit in and in contact with the step 15.

The guide block 6 is attached to the chuck body 1 by screwing attaching screws 16 and 16 which penetrate the attaching wall 9 in the thickness direction in a plurality of sites thereof. In this case, by using the attaching screw 16 having a length to such an extent that its tip is not protruded to the inside of the recess 10, the attaching screw 16 is prevented from being in touch with the lever 11 to disturb the operation.

Reference numeral 21 in the drawing denotes an attaching hole opened in the chuck body 1.

In the chuck having the above construction, when compressed air is supplied from the port 12 to the head side pressure chamber 2a and compressed air in the rod side pressure chamber 2b is exhausted from the port 13, the piston 3 and the rod 4 are moved downward in the diagram, and the pair of jaw components 5 and 5 are moved via the levers 11 and 11 so as to be apart from each other, thereby opening the jaw components 5 and 5. When compressed air is supplied from the port 13 to the rod side pressure chamber 2b and compressed air in the head side pressure chamber 2a is exhausted from the port 12, the piston 3 and the rod 4 are moved upward in the diagram, and the pair of jaw components 5 are closed, thereby gripping a workpiece.

The guide block 6 for guiding the pair of jaw components 5 and 5 integrally comprises the block body 7, the guide walls 8 and 8, and the attaching wall 9. The relative positions of these elements are unchanged and always have a proper positional relation. Consequently, only by checking the fastened state of the attaching screws 16 of the attaching wall 9 to the chuck body 1, the gripping operation of the jaw components 5 and 5 can be performed always stably and certainly. It is not necessary to conduct a troublesome check of assembly state as conventionally performed.

The attaching wall 9 is eccentrically projected on one side of the block body 7 and in contact with one side face of the chuck body, and attached to the chuck body 1 by screwing the attaching screw 16 in the thickness direction of the attaching piece 9. The attachment by the attaching screw 16 is therefore very easy. Further, the thickness of the chuck body 1 can be reduced irrespective of the size of the attaching screw 16 and the like. Consequently, the whole chuck can be slimmed and miniaturized.

In the above embodiment, the levers 11 and 11 each having an almost L shape are used as transforming means for transforming the operation of the piston rod 4 to the gripping operation of the jaw components 5 and 5. The transforming means is not limited to such construction.

Figure 6:
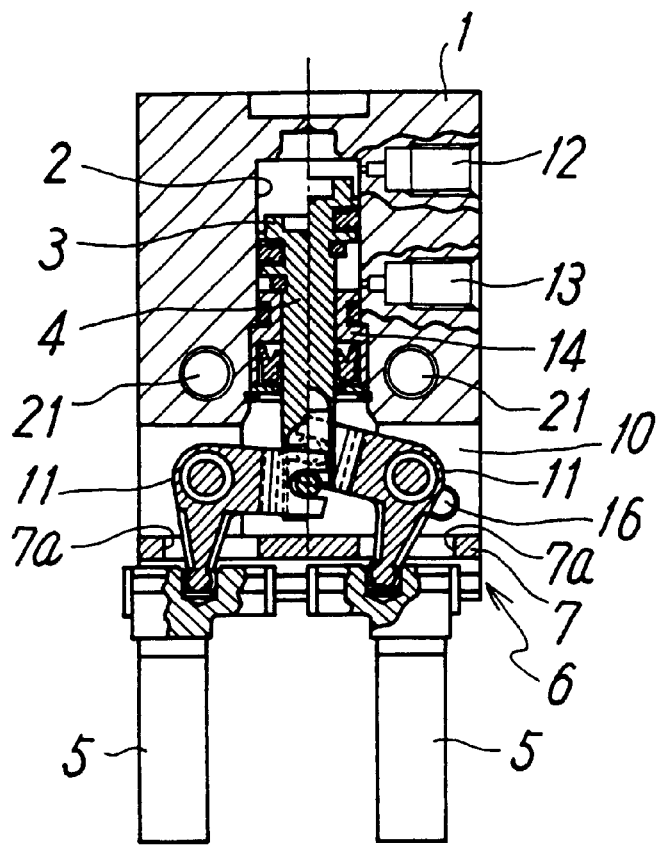
FIG. 6 is a longitudinal sectional front view showing a third embodiment of the invention. The right side shows a state where a piston is moved upward and the left side shows a state where the piston is moved downward.
Figure 7:
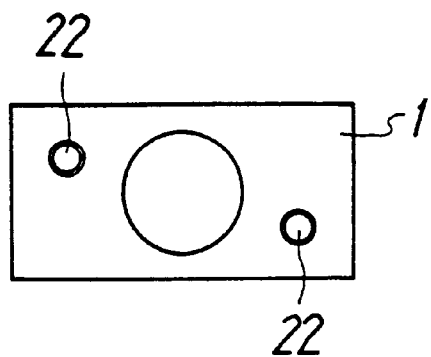
FIG. 7 is a plan view of the embodiment.

In a third embodiment shown in FIGS. 6 and 7, the permanent magnet 18 and the groove 19 for mounting the magnetic sensor in the first embodiment are omitted, thereby reducing the dimension of the piston 3 and the chuck body 1 as much as possible. Also in a space in the upper portion of the chuck body 1, which is generated by omitting the groove 19, screw holes 22 and 22 for attachment are opened.

Since the construction and action in each of the second embodiment shown in FIGS. 4 and 5 and the third embodiment shown in FIGS. 6 and 7 are substantially the same as those of the first embodiment shown in FIGS. 1 to 3 except for the above, main corresponding components are designated by the same reference numerals as those of the first embodiment and their descriptions are omitted.

Figure 8:
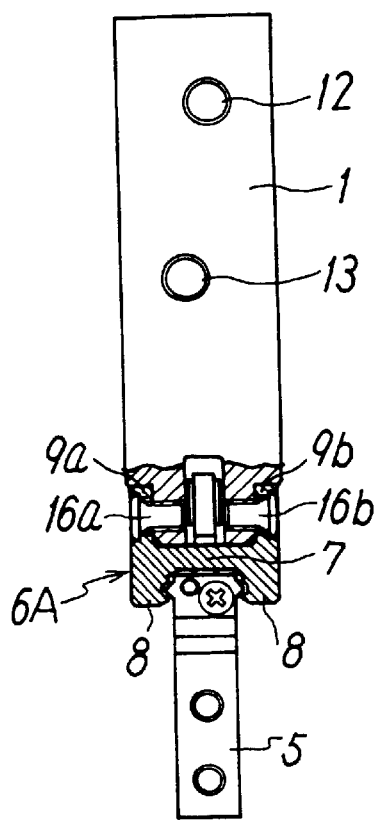
FIG. 8 is a partly sectional side view showing a fourth embodiment of the invention.
Figure 9:
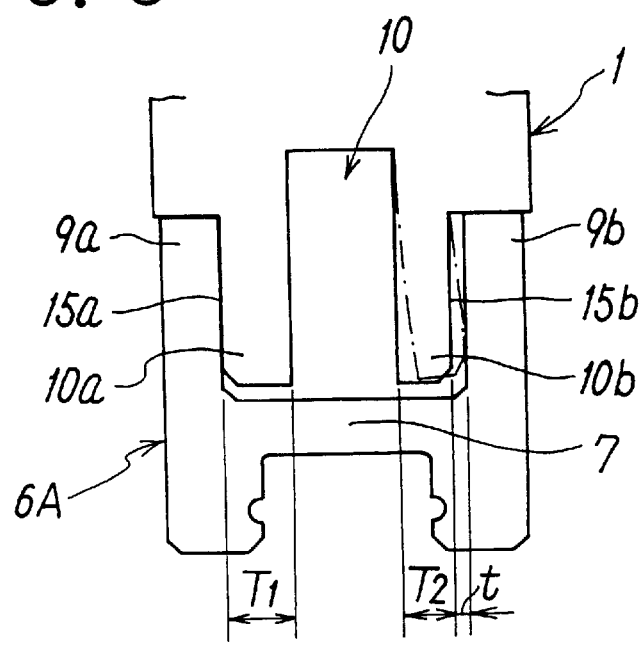
FIG. 9 is an enlarged view of the main portion showing attachment of a guide block of the embodiment to the chuck body.
Figure 10:
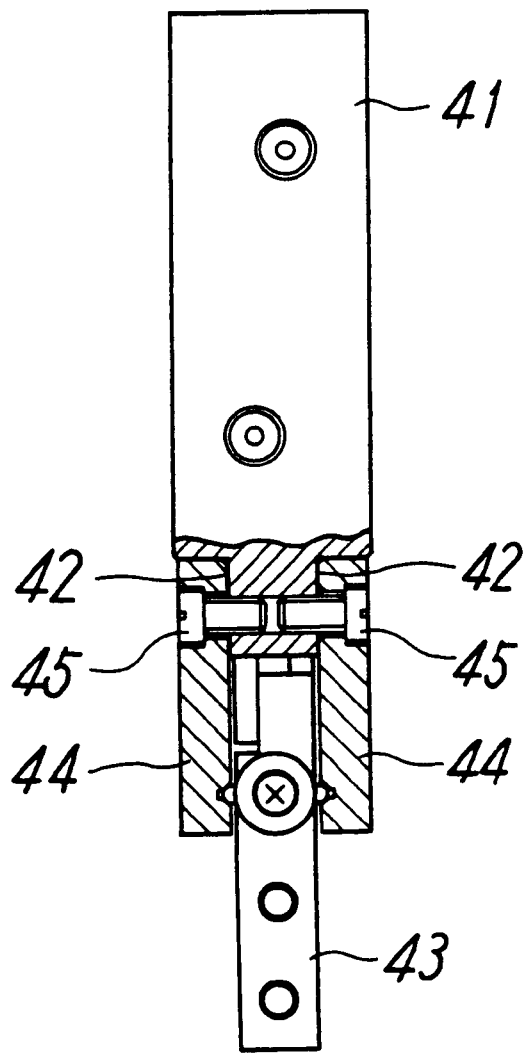
FIG. 10 is a partly sectional side view showing a conventional chuck.

FIGS. 8 and 9 show a fourth embodiment of the invention. The chuck of the fourth embodiment is different from that of the first embodiment with respect to the following point. In the first embodiment, the guide block 6 has only one attaching wall 9 on the first face of the block body 7. On the other hand, in the fourth embodiment, a guide block 6A has a pair of attaching walls 9a and 9b which extend in parallel with each other at both ends in the width direction on the first face of the block body 7. On both opposite outer faces of the chuck body 1, accordingly, steps 15a and 15b into which the two attaching walls 9a and 9b are fit, respectively, are formed. The attaching walls 9a and 9b are fixed by the attaching screws 16a and 16b in a state where the attaching walls 9a and 9b are fit in and in contact the steps 15a and 15b, respectively.

In this case, as shown in FIG. 9, in order to make the guide block 6 fit in the chuck body 1 easily, preferably, the interval between the attaching walls 9a and 9b is set to be slightly larger than the distance between the steps 15a and 15b. For this purpose, one of the steps, 15b, is formed so as to be deeper than the other step 15a to form a small gap t between the step 15b and the attaching wall 9b. With respect to the pair of walls 10a and 10b on both sides of the recess 10, the thickness $T_2$ of the wall 10b on the step 15b side is smaller than the thickness $T_1$ of the other wall 10a.

When the guide block 6A is attached to the chuck body 1, the two attaching walls 9a and 9b in the guide block 6A are fit in the pair of walls 10a and 10 b at the lower end of the chuck body 1. After that, one of the attaching walls, 9a, is fixed to the wall 10a by the plurality of attaching screws 16a which penetrate the attaching wall 9a in the thickness direction. After that, similarly, the other attaching wall 9b is fixed to the wall 10b by the plurality of attaching screws 16b. At this time, as shown in FIG. 9, by the fastening of the attaching screws 16b, the thin wall 10b is deflected to the attaching wall 9b side and the gap t is absorbed.

Since the construction and action except for the above in the fourth embodiment are substantially the same as those of the first embodiment, main corresponding components are designated by the same reference numerals as those of the first embodiment and their descriptions are omitted. Further, in the fourth embodiment, various constructions especially shown in the second and third embodiments can be adopted.

In the chuck of the fourth embodiment, by forming the two attaching walls 9a and 9b in the guide block 6A, the guide block body can be attached to the chuck body 1 more easily and securely as compared with the case where the number of the attaching wall is one. It can be prevented that a stress is concentrated on one of the attaching walls by a moment or the like which occurs when a workpiece is gripped and carried. Thus, the rigidity of the guide block 6A is increased and stable attachment can be realized.

Since the pair of attaching walls 9a and 9b are attached to the chuck body 1 by screwing the attaching screws 16a and 16b into the thickness direction of the attaching walls 9a and 9b, in a manner similar to the first embodiment, the attachment is very easy and reduction in thickness of the chuck body 1 is not disturbed.

Further, even when there is the slight gap t between the attaching wall 9b and the wall 10b of the recess 10 in the chuck body 1, the attaching wall 9b can be securely fixed to the chuck body 1. Since the adjustment of the chuck body 1 and the guide block 6A does not require high accuracy, the dimensional adjustment of the members is very easy.

As specifically described above, in the chuck of the invention, since the guide block for linearly guiding the pair of jaw components integrally has the block body, the guide walls, and the attaching walls, the relative positions of these elements are unchanged and always have a proper relative positional relation. Consequently, only by checking the fastened state of the attaching walls to the chuck body by the attaching screws, the gripping operation of the jaw components can be always made stable and certain and a troublesome check of the assembly state of the guide members can be omitted.

Since the attaching walls can be attached to the chuck body by screwing the attaching screws in the thickness direction of the attaching walls in a state where the attaching walls are in contact with the outer face of the chuck body, attachment by the attaching screws is very easy and, further, the thickness of the chuck body can be reduced irrespective of the size of the attaching screw or the like. The whole chuck can be therefore slimmed and miniaturized.

What is claimed is:

1. A parallelly-gripping chuck comprising: a chuck body in which a cylindrical hole is opened; a piston which is slidably inserted in the cylindrical hole and is driven in the axial direction by air pressure; a piston rod which is attached to the piston and whose tip is projected from one end of the cylindrical hole; a pair of jaw components which are mounted at an end on a side from which the piston rod is projected of the chuck body via a guide block so as to be opened and closed; transforming means for transforming a movement of the piston rod to an opening/closing operation of the pair of jaw components; and the guide block for linearly guiding the opening/closing operation of the pair of jaw components in the direction which perpendicularly crosses the axial line of the rod, wherein the guide block integrally has: a block body of a substantially rectangular shape, having a first face on one side and a second face on the opposite side; a pair of guide walls which are formed integrally and symmetrically on the first face side of the block body, and extend in parallel with each other in the length direction of the block body, and between which the pair of jaw components are slidably fit; and at least one attaching wall which is integrally formed on the second face side of the block body and extends in the length direction of the block body, and the attaching wall is attached to the chuck body by being in contact with the outer face of an end of the chuck body and being fixed by attaching screws.

2. The chuck according to claim 1, wherein a step at least having a depth which is equal to a thickness of the attaching wall is formed on the outer face of the chuck body, and the attaching wall is fixed to the chuck body in a state where the attaching wall is fit in the step so as not to be projected from the outer face of the chuck body.

3. The chuck according to claim 2, wherein the guide block has one attaching wall on one end side in the width direction of the first face of the block body, and the chuck body has one step on an outer face.

4. The chuck according to claim 2, wherein the guide block has two attaching walls which extend in parallel with each other at both ends in the width direction of the first face of the block body, and the chuck body has steps in which the two attaching walls are fit on both opposite outer faces.

5. The chuck according to claim 4, wherein one of the two steps is formed to be slightly deeper than the other step so that an interval between two attaching walls is slightly larger than a distance between the two steps, and a gap between the step and the attaching wall is absorbed by a deflection of the step when each of the attaching walls is screwed to each of the steps.

6. The chuck according to claim 2, wherein the transforming means is a pair of levers, an intermediate portion of each of the levers is pivotally supported by the chuck body, one end is connected to the piston rod, the other end extends to a position between the pair of guide walls through a leading hole formed on the block body of the guide block, and the levers are connected to corresponding jaw components.

7. The chuck according to claim 1, wherein the transforming means is a pair of levers, an intermediate portion of each of the levers is pivotally supported by the chuck body, one end of the lever is connected to the piston rod, the other end extends to a position between the pair of guide walls through a leading hole formed on the block body of the guide block, and the levers are connected to corresponding jaw components.

* * * * *